United States Patent
Zhang et al.

(10) Patent No.: US 11,695,528 B2
(45) Date of Patent: Jul. 4, 2023

(54) DELAY MINIMIZATION FOR CSI-RS AND SRS TRANSMISSION

(71) Applicant: QUALCOMM Incorporated, San Diego, CA (US)

(72) Inventors: Xiaoxia Zhang, San Diego, CA (US); Tao Luo, San Diego, CA (US); Makesh Pravin John Wilson, San Diego, CA (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/460,831

(22) Filed: Jul. 2, 2019

(65) Prior Publication Data
US 2020/0052837 A1  Feb. 13, 2020

Related U.S. Application Data

(60) Provisional application No. 62/717,641, filed on Aug. 10, 2018.

(51) Int. Cl.
*H04L 5/00* (2006.01)
*H04W 76/28* (2018.01)
(Continued)

(52) U.S. Cl.
CPC .......... *H04L 5/005* (2013.01); *H04L 25/0226* (2013.01); *H04W 24/10* (2013.01); *H04W 76/28* (2018.02); *H04W 80/02* (2013.01)

(58) Field of Classification Search
CPC ............... H04W 72/042; H04W 76/27; H04W 72/0446; H04L 5/0053; H04L 1/1812
See application file for complete search history.

(56) References Cited

U.S. PATENT DOCUMENTS

| | | | |
|---|---|---|---|
| 2013/0012252 A1* | 1/2013 | Suzuki | H04W 52/325 455/509 |
| 2015/0181450 A1 | 6/2015 | Xin et al. | |

(Continued)

FOREIGN PATENT DOCUMENTS

TW  201807964 A  3/2018

OTHER PUBLICATIONS

International Search Report and Written Opinion—PCT/US2019/040528—ISA/EPO—dated Sep. 19, 2019.
(Continued)

*Primary Examiner* — Atique Ahmed
(74) *Attorney, Agent, or Firm* — Patterson & Sheridan, LLP

(57) ABSTRACT

Certain aspects of the present disclosure provide techniques for sounding reference signal (SRS) resource configuration enhancements. A method generally receiving pre-configuration information for one or more reference signal transmissions, performing, at a first time during an ON duration of a discontinuous reception (DRX) cycle, measurements on one or more reference signals based, at least in part, on the pre-configuration information, determining if, at a second time during the ON duration after the first time, a trigger frame associated with the one or more reference signal transmissions has been received, and transmitting a measurement report corresponding to the measurements if a trigger frame has been received.

39 Claims, 17 Drawing Sheets

(51) Int. Cl.
*H04L 25/02* (2006.01)
*H04W 80/02* (2009.01)
*H04W 24/10* (2009.01)

(56) References Cited

U.S. PATENT DOCUMENTS

| | | | |
|---|---|---|---|
| 2016/0073366 A1* | 3/2016 | Ng | H04W 48/12 370/329 |
| 2016/0262000 A1* | 9/2016 | Koorapaty | H04W 76/28 |
| 2016/0338050 A1 | 11/2016 | Kim et al. | |
| 2018/0063883 A1 | 3/2018 | Nagaraja et al. | |
| 2018/0227035 A1 | 8/2018 | Cheng et al. | |
| 2018/0302889 A1* | 10/2018 | Guo | H04B 7/088 |
| 2018/0343653 A1* | 11/2018 | Guo | H04W 4/70 |
| 2019/0097874 A1* | 3/2019 | Zhou | H04W 16/28 |
| 2019/0182800 A1* | 6/2019 | Park | H04L 5/0048 |
| 2019/0207737 A1* | 7/2019 | Babaei | H04W 24/08 |
| 2019/0281546 A1* | 9/2019 | Lim | H04L 1/0027 |
| 2020/0052837 A1* | 2/2020 | Zhang | H04B 7/0626 |
| 2020/0106573 A1* | 4/2020 | Cirik | H04W 74/0833 |

OTHER PUBLICATIONS

Mediatek Inc: "DL and UL Beam Management", 3GPP Draft, R1-1718333_Beamindication_ULBM_Final, 3rd Generation Partnership Project (3GPP), Mobile Competence Centre, 650, Route Des Lucioles, F-06921 Sophia-Antipolis Cedex, France, vol. RAN WG1, No. Prague, Czechia, Oct. 9, 2017-Oct. 13, 2017, Oct. 3, 2017 (Oct. 3, 2017), XP051352958, 7 Pages, Retrieved from the Internet: URL:http://www.3gpp.org/ftp/tsg_ran/WG1_RL1/TSGR1_90b/Docs/ [retrieved on Oct. 3, 2017], section 2, section 3.2.
Taiwan Search Report—108123591—TIPO—dated Aug. 14, 2022.
Taiwan Search Report—TW111137795—TIPO—dated Jan. 23, 2023.

* cited by examiner

| | RSRP (CRI/SSBIdx) | Wideband CRI-RI-CQI | Sub-band CRI-RI-CQI |
|---|---|---|---|
| $T_{DCI\text{-}CSIRS}$: Time from DCI to AP-CSI-RS Tx | {14,28,48} | {14,28,48} | {14,28,48} |
| Num CSIRS Symbols | 2 | 2 | 2 |
| $T_{CSIRS\text{-}UL}$: Time from end of AP-CSI-RS to First UL symbol CSI-Report | {14,28,56} | 39 | 143 |
| Total Latency of AP CSI-RS Based | {30,58,106} | {55,69,89} | {159,173,193} |

|  | RSRP (CRI/SSBIdx) | Wideband CRI-RI-CQI |
|---|---|---|
| $T_{DCI\text{-}CSI\text{-}RS}$: Time from DCI to AP-CSI-RS Tx | 2 | 2 |
| Num CSIRS Symbols | 2 | 2 |
| $T_{CSI\text{-}RS\text{-}UL}$: Time from end of AP-CSI-RS to First UL symbol CSI-Report | {14,28,56} | 39 |
| Total Latency of AP CSI-RS Based | {18,32,60} | {43,43,43} |

FIG. 11

DELAY MINIMIZATION FOR CSI-RS AND SRS TRANSMISSION

CLAIM OF PRIORITY UNDER 35 U.S.C. § 119

This application claims benefit of U.S. Provisional Patent Application Ser. No. 62/717,641, filed Aug. 10, 2018, which is herein incorporated by reference in its entirety.

FIELD OF THE DISCLOSURE

Aspects of the present disclosure relate to wireless communications, and more particularly, to techniques for delay minimization for channel state information reference signal (CSI-RS) and sounding reference signal (SRS) transmission.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications in a network by a user equipment (UE). The method generally includes receiving pre-configuration information for one or more reference signal transmissions, performing, at a first time during an ON duration of a discontinuous reception (DRX) cycle, measurements on one or more reference signals based, at least in part, on the pre-configuration information, determining if, at a second time during the ON duration after the first time, a trigger frame associated with the one or more reference signal transmissions has been received, and transmitting a measurement report corresponding to the measurements if a trigger frame has been received.

Certain aspects provide an apparatus for wireless communications in a network by a user equipment (UE). The apparatus generally includes at least one processor configured to receive pre-configuration information for one or more reference signal transmissions, perform, at a first time during an ON duration of a discontinuous reception (DRX) cycle, measurements on one or more reference signals based, at least in part, on the pre-configuration information, determine if, at a second time during the ON duration after the first time, a trigger frame associated with the one or more reference signal transmissions has been received, and transmit a measurement report corresponding to the measurements if a trigger frame has been received. The apparatus also generally includes a memory coupled with the at least one processor.

Certain aspects provide an apparatus for wireless communications in a network by a user equipment (UE). The apparatus generally includes means for receiving pre-configuration information for one or more reference signal transmissions, means for performing, at a first time during an ON duration of a discontinuous reception (DRX) cycle, measurements on one or more reference signals based, at least in part, on the pre-configuration information, means for determining if, at a second time during the ON duration after the first time, a trigger frame associated with the one or more reference signal transmissions has been received, and means for transmitting a measurement report corresponding to the measurements if a trigger frame has been received.

Certain aspects provide a non-transitory computer-readable medium for wireless communications in a network by a user equipment (UE). The non-transitory computer-readable medium generally includes instructions that, when executed by at least one processor, configure the at least one processor to receive pre-configuration information for one or more reference signal transmissions, perform, at a first time during an ON duration of a discontinuous reception (DRX) cycle, measurements on one or more reference signals based, at least in part, on the pre-configuration information, determine if, at a second time during the ON duration after the first time, a trigger frame associated with the one or more reference signal transmissions has been received, and transmit a measurement report corresponding to the measurements if a trigger frame has been received.

Certain aspects provide a method for wireless communications in a network by a user equipment (UE). The method generally includes receiving pre-configuration information indicating a transmission configuration indicator (TCI) state for one or more reference signal transmissions, receiving a trigger frame associated with the one or more reference signal transmissions, and transmitting the one or more reference signal transmissions based on the pre-configured TCI state.

Certain aspects provide an apparatus for wireless communications in a network by a user equipment (UE). The apparatus generally includes at least one processor configured to receive pre-configuration information indicating a transmission configuration indicator (TCI) state for one or more reference signal transmissions, receive a trigger frame associated with the one or more reference signal transmissions, and transmit the one or more reference signal transmissions based on the pre-configured TCI state. The apparatus also generally includes a memory coupled with the at least one processor.

Certain aspects provide an apparatus for wireless communications in a network by a user equipment (UE). The apparatus generally includes means for receiving pre-configuration information indicating a transmission configuration indicator (TCI) state for one or more reference signal transmissions, means for receiving a trigger frame associated with the one or more reference signal transmissions, and means for transmitting the one or more reference signal transmissions based on the pre-configured TCI state.

Certain aspects provide a non-transitory computer-readable medium for wireless communications in a network by a user equipment (UE). The non-transitory computer-readable medium generally includes instructions that, when executed by at least one processor, configure the at least one processor to receive pre-configuration information indicating a transmission configuration indicator (TCI) state for one or more reference signal transmissions, receive a trigger frame associated with the one or more reference signal transmissions, and transmit the one or more reference signal transmissions based on the pre-configured TCI state.

Certain aspects provide a method for wireless communications in a network by a base station (BS). The method generally includes transmitting, to a user equipment, pre-configuration information for one or more reference signal transmissions, wherein the pre-configuration information comprises a first transmission pre-configuration indicator (TCI) state for the one or more reference signal transmissions, transmitting a trigger frame for the one or more reference signal transmissions, wherein the trigger frame includes a second TCI state for the one or more reference signal transmissions, and receiving a measurement report associated with the first TCI state for the one or more reference signal transmissions.

Certain aspects provide an apparatus for wireless communications in a network by a base station (BS). The apparatus generally includes at least one processor configured to transmit, to a user equipment, pre-configuration information for one or more reference signal transmissions, wherein the pre-configuration information comprises a first transmission pre-configuration indicator (TCI) state for the one or more reference signal transmissions, transmit a trigger frame for the one or more reference signal transmissions, wherein the trigger frame includes a second TCI state for the one or more reference signal transmissions, and receive a measurement report associated with the first TCI state for the one or more reference signal transmissions. The apparatus also generally includes a memory coupled with the at least one processor.

Certain aspects provide an apparatus for wireless communications in a network by a user equipment (UE). The apparatus generally includes means for transmitting, to a user equipment, pre-configuration information for one or more reference signal transmissions, wherein the pre-configuration information comprises a first transmission pre-configuration indicator (TCI) state for the one or more reference signal transmissions, means for transmitting a trigger frame for the one or more reference signal transmissions, wherein the trigger frame includes a second TCI state for the one or more reference signal transmissions, and means for receiving a measurement report associated with the first TCI state for the one or more reference signal transmissions.

Certain aspects provide a non-transitory computer-readable medium for wireless communications in a network by a user equipment (UE). The non-transitory computer-readable medium generally includes instructions that, when executed by at least one processor, configure the at least one processor transmit, to a user equipment, pre-configuration information for one or more reference signal transmissions, wherein the pre-configuration information comprises a first transmission pre-configuration indicator (TCI) state for the one or more reference signal transmissions, transmit a trigger frame for the one or more reference signal transmissions, wherein the trigger frame includes a second TCI state for the one or more reference signal transmissions, and receive a measurement report associated with the first TCI state for the one or more reference signal transmissions.

Certain aspects provide a method for wireless communications in a network by a base station (BS). The method generally includes transmitting, to a user equipment (UE), pre-configuration information indicating a first transmission configuration indicator (TCI) state for one or more reference signal transmissions, transmitting, to the UE, a trigger frame associated with the one or more reference signal transmissions, and receiving, from the UE, the one or more reference signal transmissions based on the pre-configured TCI state.

Certain aspects provide an apparatus for wireless communications in a network by a base station (BS). The apparatus generally includes at least one processor configured to transmit, to a user equipment (UE), pre-configuration information indicating a first transmission configuration indicator (TCI) state for one or more reference signal transmissions, transmit, to the UE, a trigger frame associated with the one or more reference signal transmissions, and receive, from the UE, the one or more reference signal transmissions based on the pre-configured TCI state. The apparatus also generally includes a memory coupled with the at least one processor.

Certain aspects provide an apparatus for wireless communications in a network by a base station (BS). The apparatus generally includes means for transmitting, to a user equipment (UE), pre-configuration information indicating a first transmission configuration indicator (TCI) state for one or more reference signal transmissions, means for transmitting, to the UE, a trigger frame associated with the one or more reference signal transmissions, and means for receiving, from the UE, the one or more reference signal transmissions based on the pre-configured TCI state.

Certain aspects provide a non-transitory computer-readable medium for wireless communications in a network by a base station (BS). The non-transitory computer-readable medium generally includes instructions that, when executed by at least one processor, configure the at least one processor transmit, to a user equipment (UE), pre-configuration information indicating a first transmission configuration indicator (TCI) state for one or more reference signal transmissions, transmit, to the UE, a trigger frame associated with the one or more reference signal transmissions, and receive, from the UE, the one or more reference signal transmissions based on the pre-configured TCI state.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 11 illustrates example reduced aperiodic CSI-RS timeline delays, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
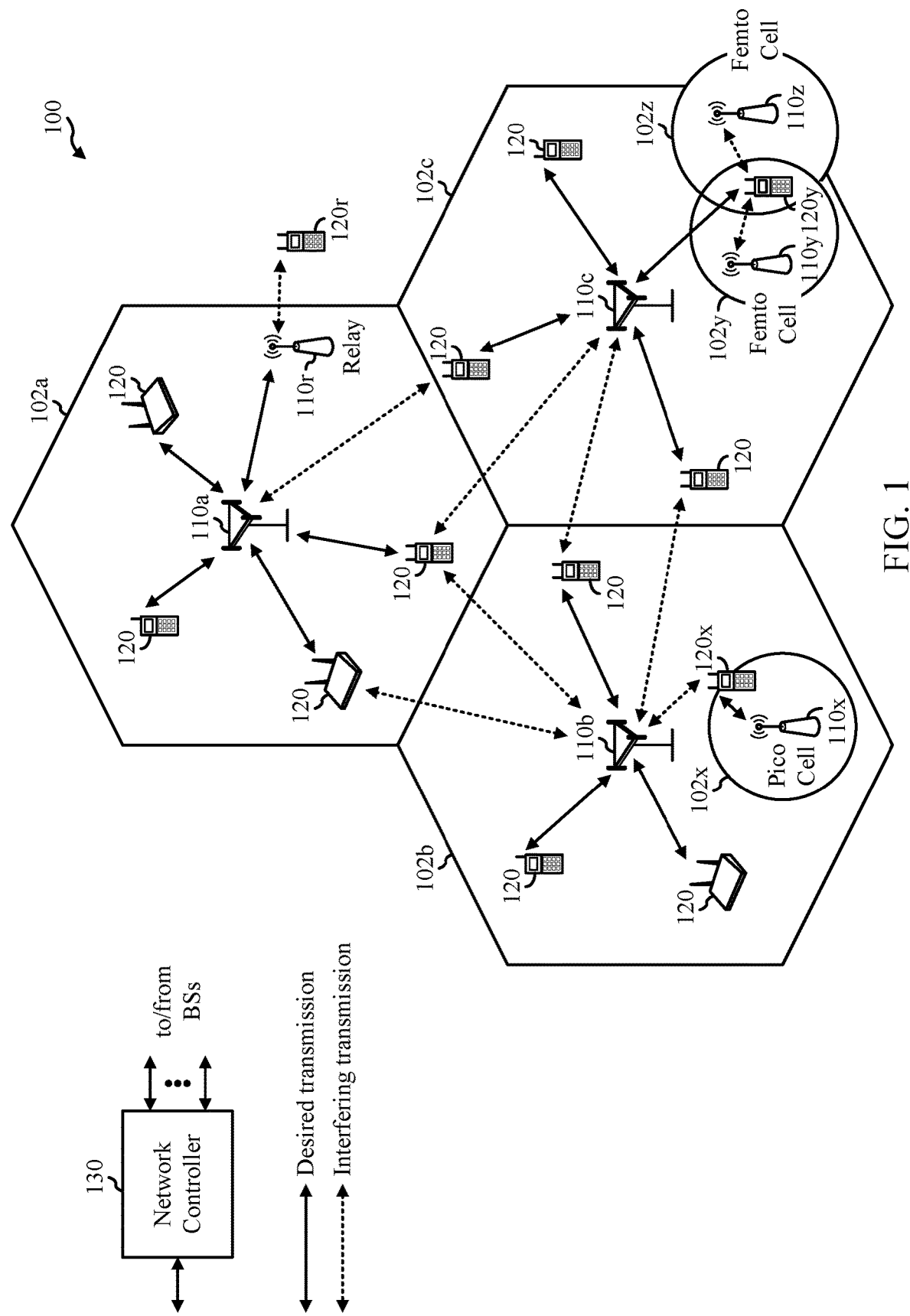
FIG. 1 is a block diagram conceptually illustrating an example telecommunications system, in accordance with certain aspects of the present disclosure.

Aspects of the present disclosure provide apparatus, methods, processing systems, and computer readable mediums for delay minimization for channel state information reference signal (CSI-RS) and sounding reference signal (SRS) transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
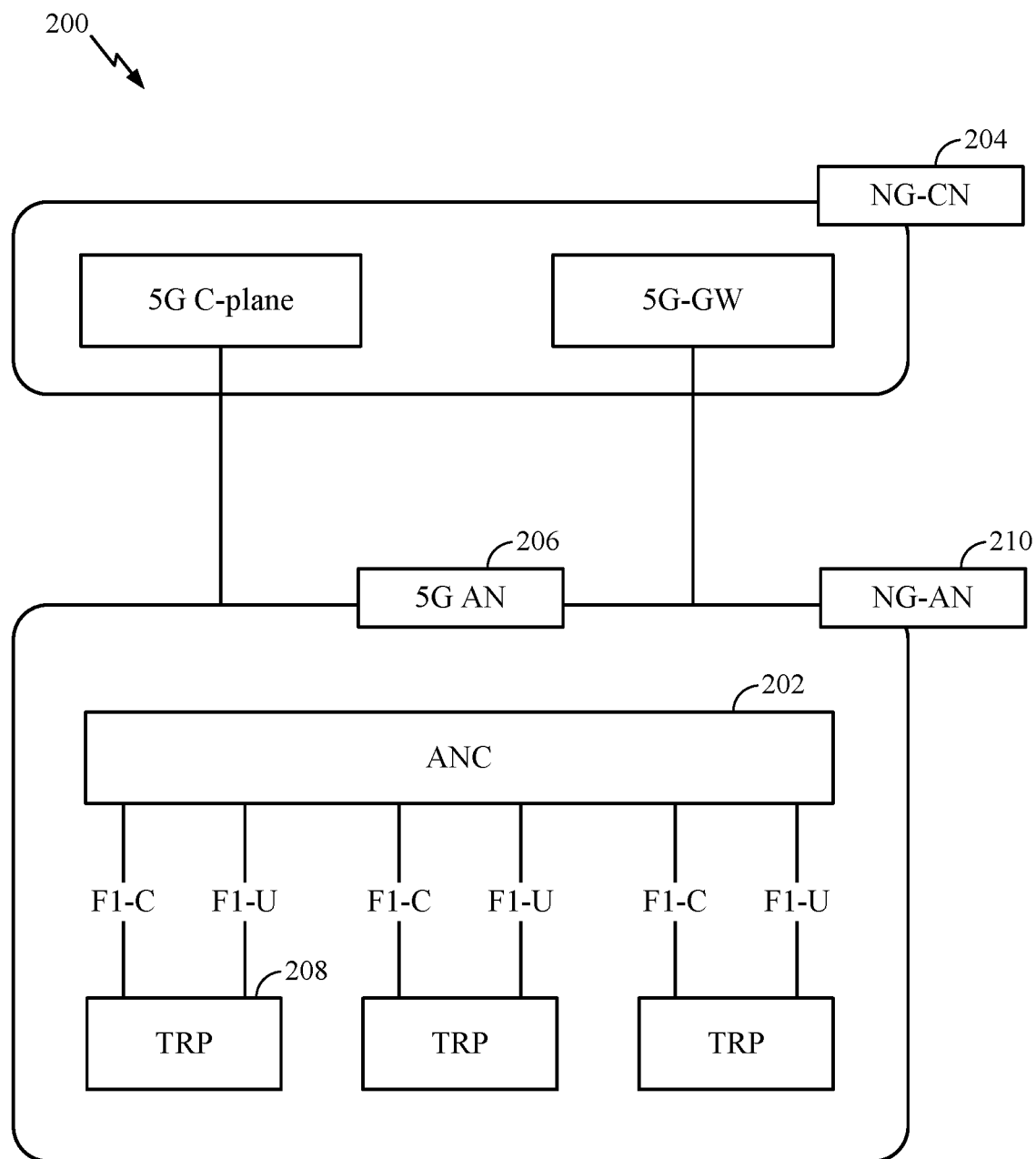
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
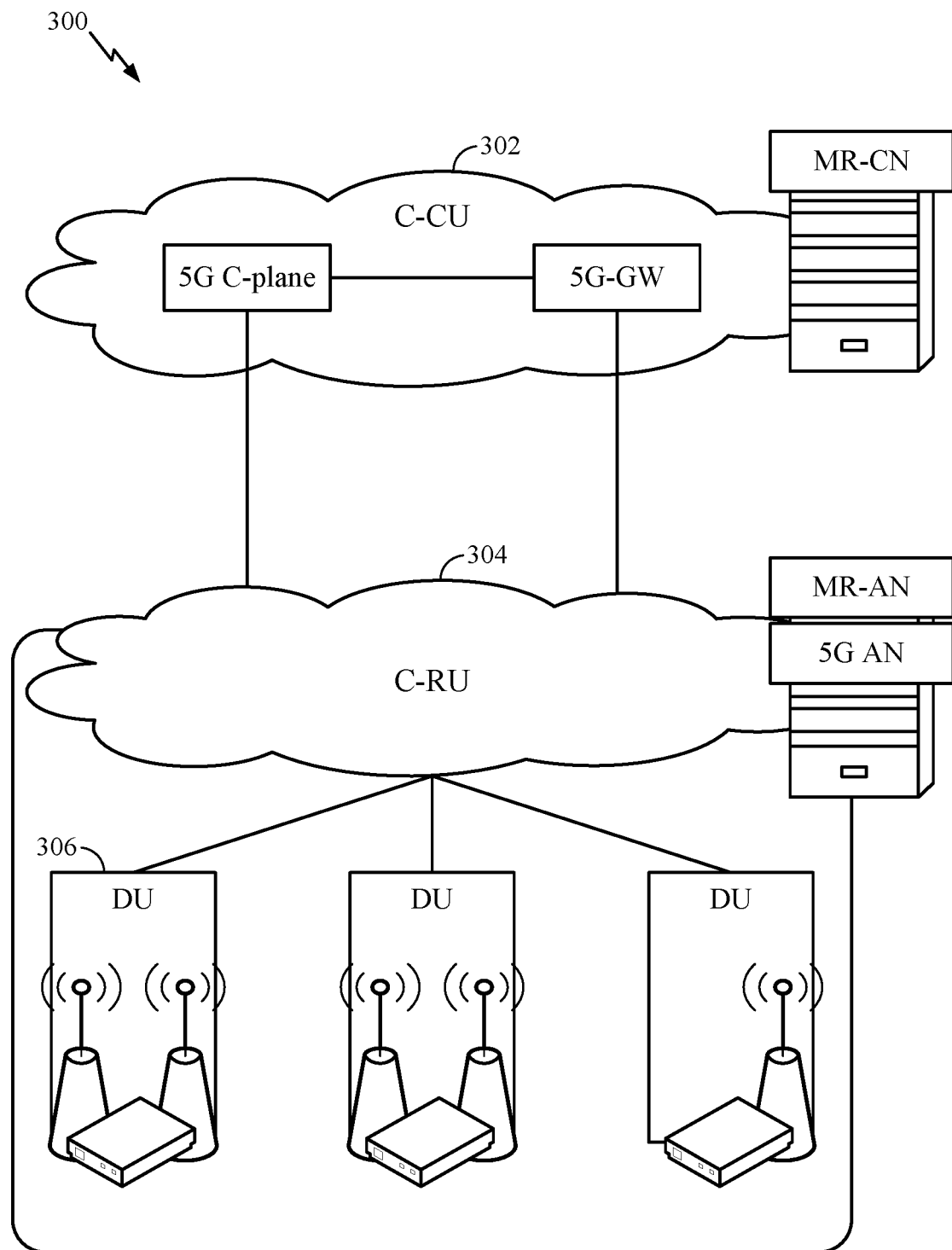
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
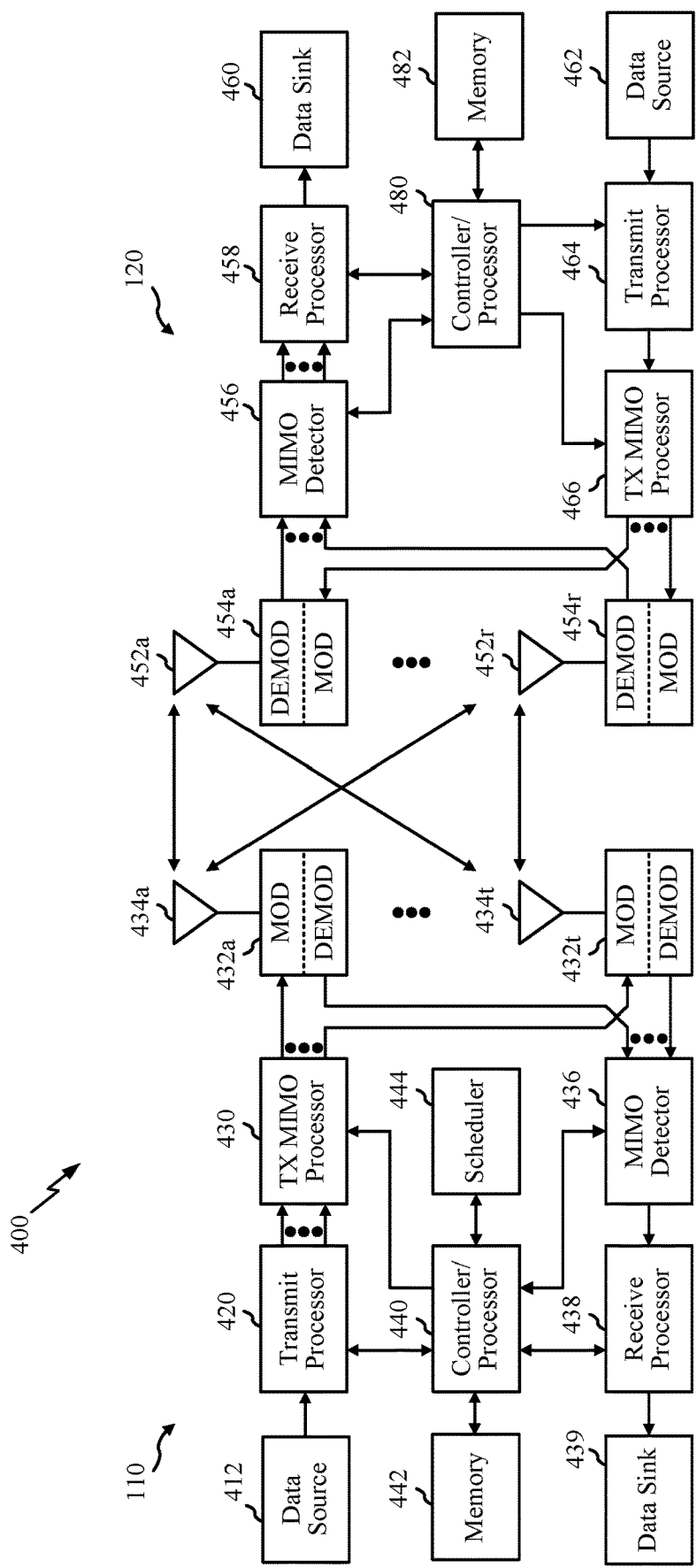
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DE-MODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
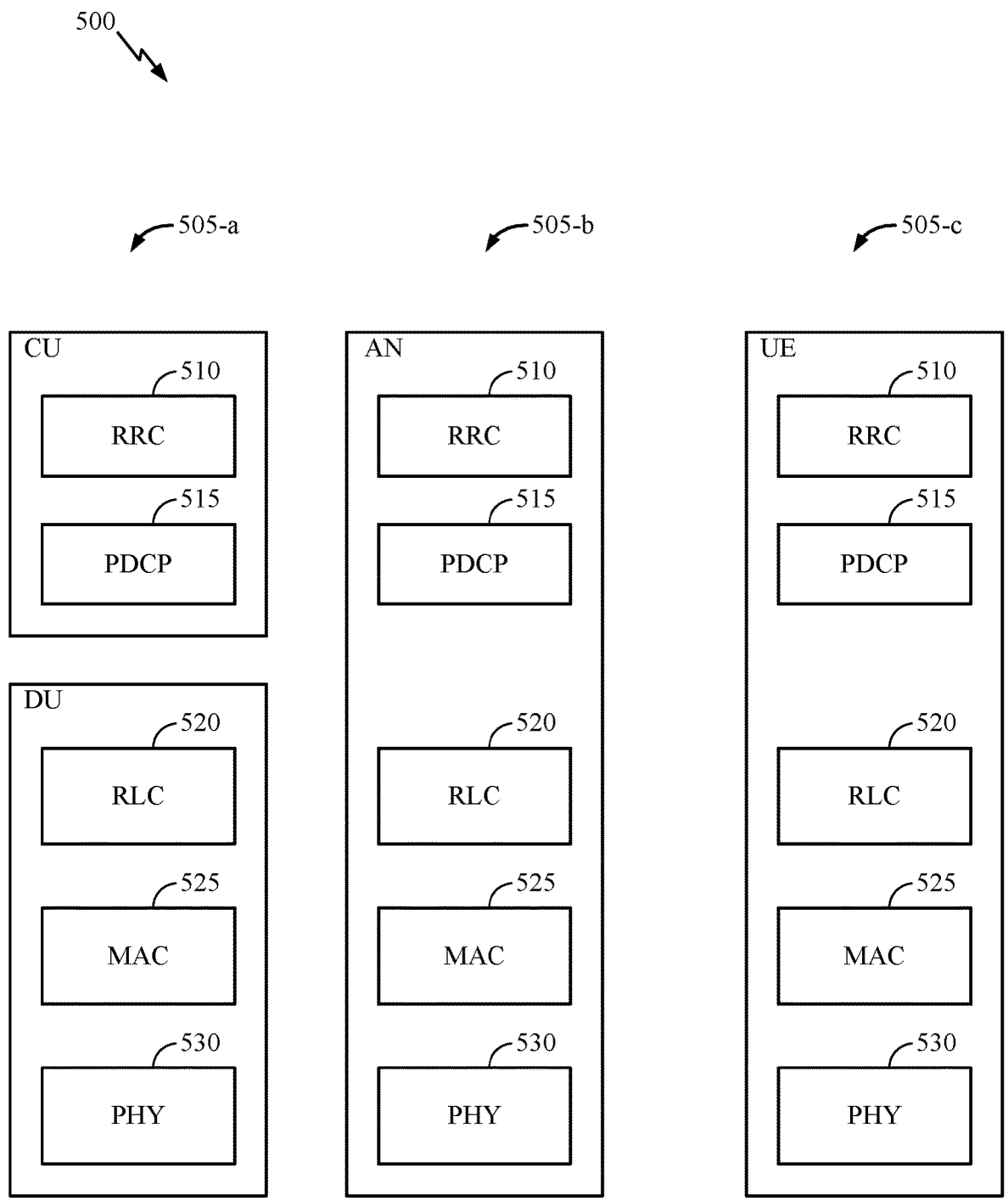
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
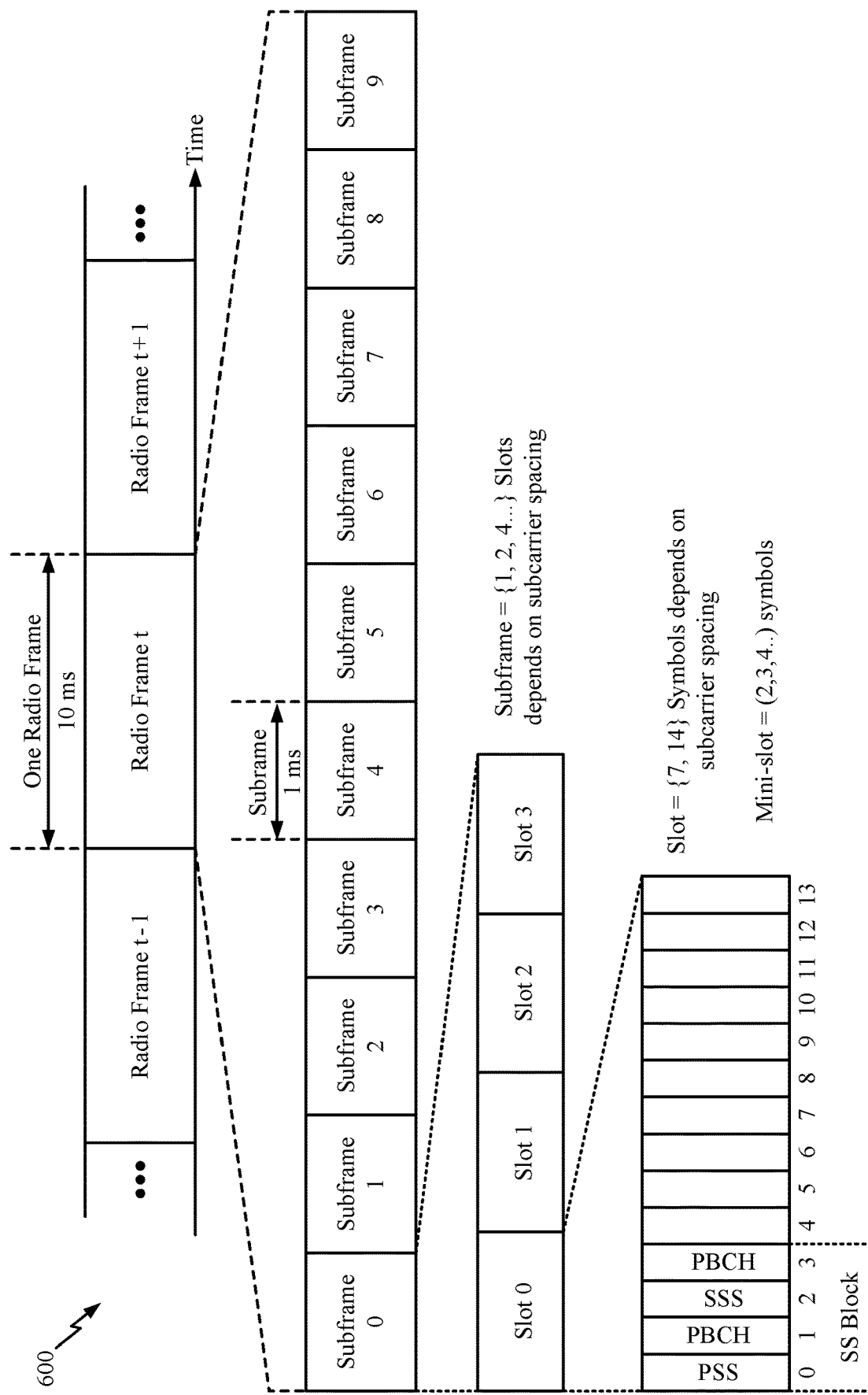
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block may be transmitted up to sixty-four times, for example, with up to sixty-four different beam directions for mmW. The up to sixty-four transmissions of the SS block are referred to as the SS burst set.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Delay Minimization for CSI-RS and SRS Transmission

Channel state information (CSI) may refer to known channel properties of a communication link and may represent the combined effects of, for example, scattering, fading, and power decay with distance between a transmitter and receiver. In wireless communication systems, such as the wireless communication system described above, channel estimation may be performed to determine these effects on the channel. CSI may be used to adapt transmissions based on the current channel conditions, which is useful for achieving reliable communication, such as communication with high data rates in multi-antenna systems. CSI is typically estimated at the receiver, quantized, and fed back to the transmitter as a CSI report. As an example, CSI may include a Channel Quality Indicator (CQI), a precoding matrix indicator (PMI), a CSI-RS resource indicator (CRI), a SS/PBCH Block Resource indicator (SSBRI), a layer indicator (LI), a rank indicator (RI) and/or L1-RSRP.

Channel state information reporting may be triggered by the network (e.g., via a BS, such as BS 110) by transmitting a CSI-RS trigger to a UE (e.g., UE 120), instructing the UE to perform CSI measurements on or more CSI-RSs transmitted by the network. In response to the CSI-RS trigger, the UE may perform measurements on the CSI-RSs transmitted by the network and generate a CSI report based on the measurements, in some cases, indicating to the network a best transmission beam to perform future data transmissions. The UE may then transmit the CSI report to the network.

Figure 7:
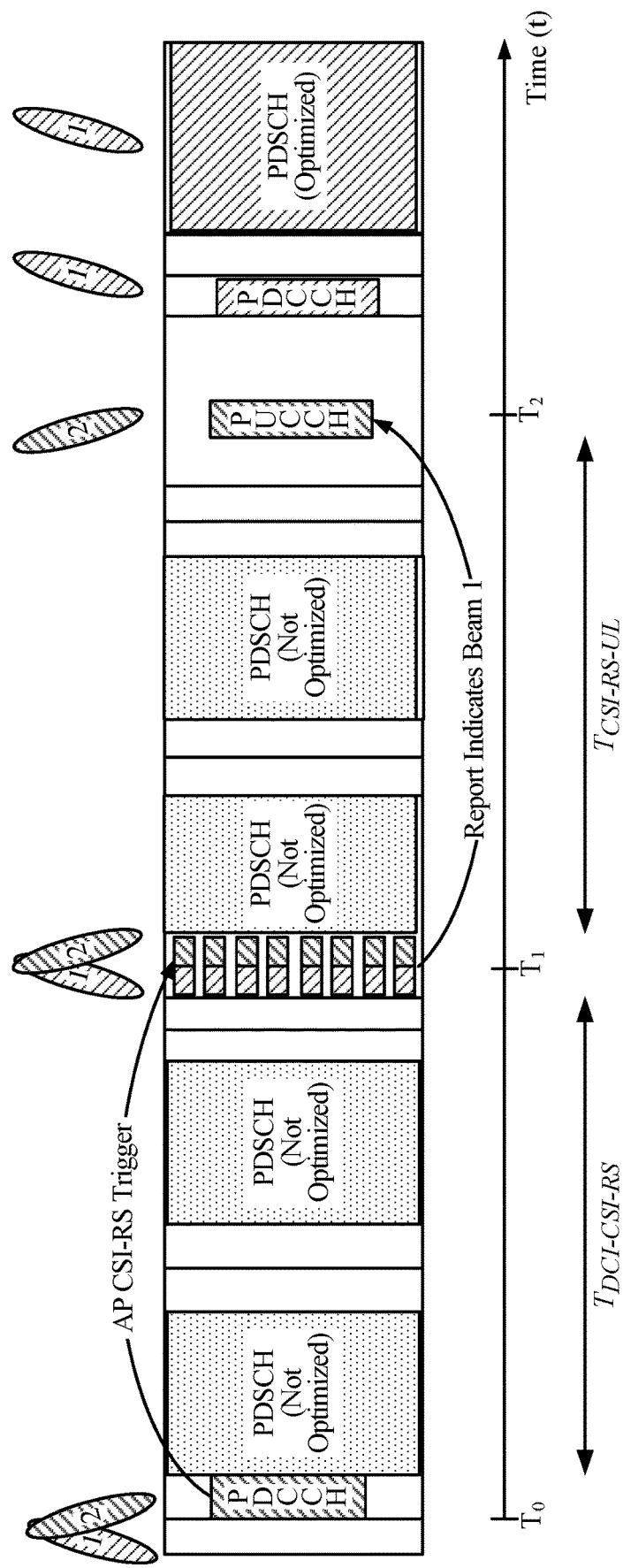
FIG. 7 illustrates an example aperiodic CSI-RS timeline, in accordance with certain aspects of the present disclosure.

FIG. 7 illustrates an example aperiodic CSI-RS timeline, according to certain aspects of the present disclosure. For example, as illustrated, a BS (e.g., gNB) may trigger aperiodic CSI-RS transmission by transmitting an aperiodic CSI-RS trigger in a physical downlink control channel (PDCCH) at time T0. According to aspects, the aperiodic CSI-RS trigger may be carried in downlink control information (DCI) carried on the PDCCH. At time T1, the gNB transmits a CSI-RS and the UE performs measurements on the CSI-RS. At time T2, the UE transits a CSI report to the network based on the measurements, indicating a best transmission beam between the gNB and the UE for future data transmissions (e.g., beam 1, as illustrated). As illustrated, the CSI-RS processing delay is equal to $T_{DCI\_CSI-RS}+T_{CSI-RS\_UL}$, representing the time it takes to receive and process the CSI-RS trigger in DCI on the PDCCH, perform the CSI-RS measurements, and generating and preparing the CSI report for transmission.

According to aspects, fast identification of the transmission beams for performing the measurements is beneficial, especially in cases where the UE may be operating in a discontinuous reception (DRX) mode and the gNB would like to schedule data quickly during a short ON duration of the DRX cycle. Current operation involves triggering an aperiodic CSI-RS followed by reception of a CSI report and then data transmission by the network. However, due to the aperiodic CSI-RS processing timeline (e.g., as illustrated in FIG. 7), non-trivial delay is involved before the gNB obtains the CSI report from the UE that includes a beam identification for performing the data transmission.

Figure 8:
FIG. 8 illustrates example aperiodic CSI-RS timeline delays, in accordance with certain aspects of the present disclosure.

For example, FIG. 8 shows a table 800 illustrating the processing time for aperiodic CSI-RS, according to certain aspects presented herein. More specifically, the table 800 illustrates the processing time from aperiodic CSI-RS Trigger to CSI-RS transmission, the number of CSI-RS symbols, the processing time from CSI-RS transmission to PUCCH report, and the total delay involved. Columns two, three, and four of table 800 show the processing time for different report purpose, such as RSRP, wideband CRI-RI-CQI, and sub-band CRI-RI-CQI, respectively. For example, column two of table 800 corresponds to the processing time for UE to report RSRP while column three shows the processing time for UE to report wideband report and column four shows processing time for UE to report subband report. The three grouped numbers in the cells of columns two, three, and four correspond to {fast, average, slow} processing time allowed in NR. As can be seen, nodes with fast processing require less processing time and nodes with slow processing require more processing time. In addition, depending on what metric a UE needs to report, the processing time can be longer or shorter. For example, subband report requires more CSI-RS processing time compared to RSRP and wideband report. Thus, as can be seen, in some cases, it may not be efficient to utilize aperiodic CSI-RSs for UEs operating in a DRX mode due to the current aperiodic CSI-RS processing timeline delays and the short DRX ON duration.

In some cases, one solution to this aperiodic CSI-RS/DRX problem may be to rely on a semi-persistent (SP) CSI-RS configuration aligned with a connected mode DRX (CDRX) configuration. However, in this case, the gNB may not always have data in each ON duration of the DRX cycle and having CSI-RS always transmitted during the ON duration may result in wasted resources. Another solution may be to rely on SP CSI-RS where, during each ON duration, the gNB sends an activation or deactivation of the CSI-RS via a media access control control element (MAC-CE). However, in this case, the UE will only tune to the beam corresponding to the SP CSI-RS once it detects activation which may incur non-trivial delay between the activation and SP CSI-RS transmission.

Thus, aspects of the present disclosure propose techniques for allowing fast UE CSI-RS processing without consistently incurring the CSI-RS processing overhead during the ON duration of a DRX cycle. Similar concepts may be extended to aperiodic SRS transmission, as described in further detail below.

Figure 9A:
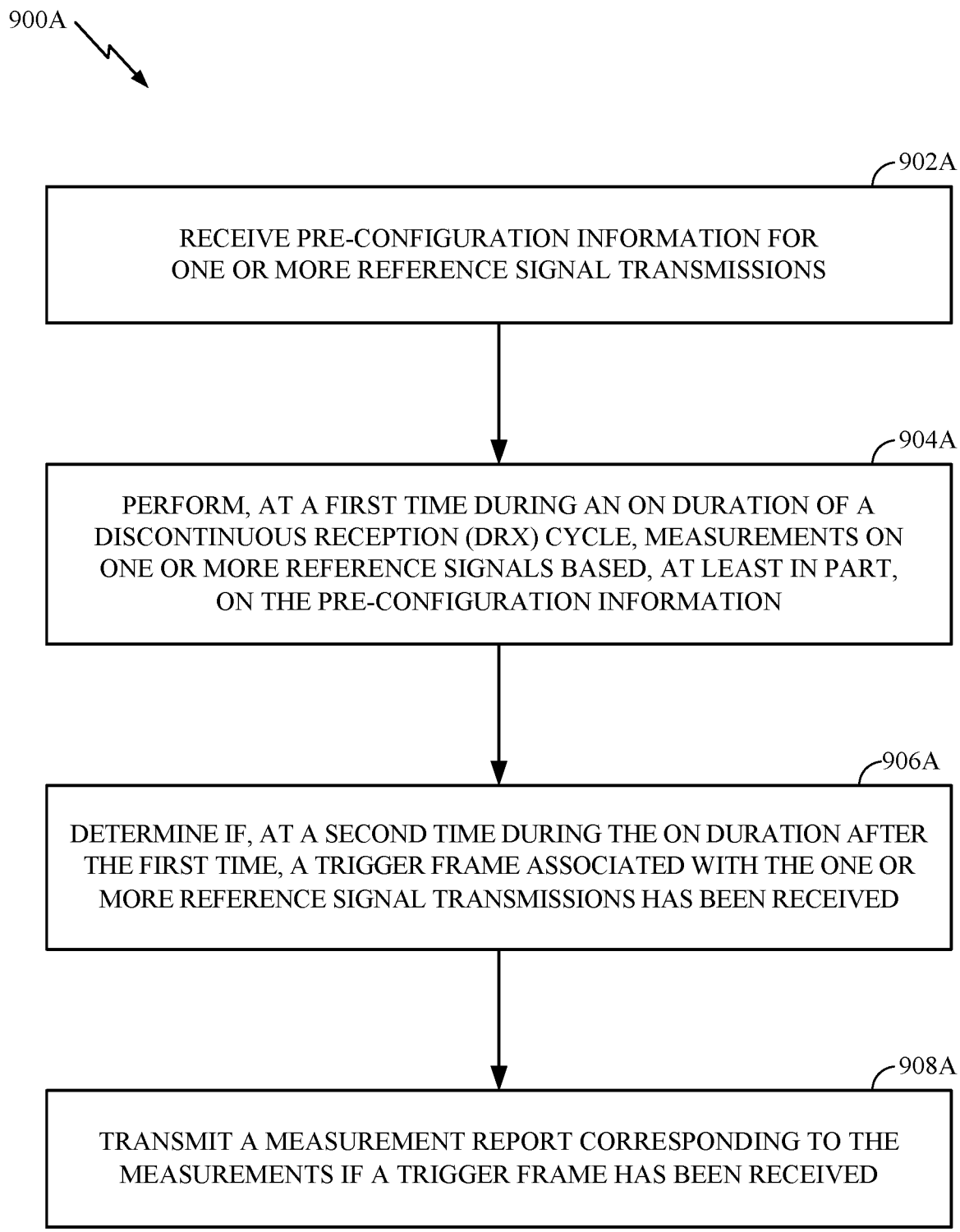
FIG. 9A illustrates example operations for wireless communications by a user equipment, in accordance with certain aspects of the present disclosure.

FIG. 9A illustrates example operations 900A for wireless communications in a network by a user equipment (UE), for example, for channel state information reference signal (CSI-RS) transmission.

According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 900A begin at 902A by receiving pre-configuration information for one or more reference signal transmissions.

At 904A, the UE performs, at a first time during an ON duration of a discontinuous reception (DRX) cycle, measurements on one or more reference signals based, at least in part, on the pre-configuration information.

At 906A, the UE determines if, at a second time during the ON duration after the first time, a trigger frame associated with the one or more reference signal transmissions has been received.

At 908A, the UE transmits a measurement report corresponding to the measurements if a trigger frame has been received. In some cases, while not illustrated, if the UE does not receive a trigger frame, the UE discard/abort the CSI-RS measurement results and/or measurements.

Figure 9B:
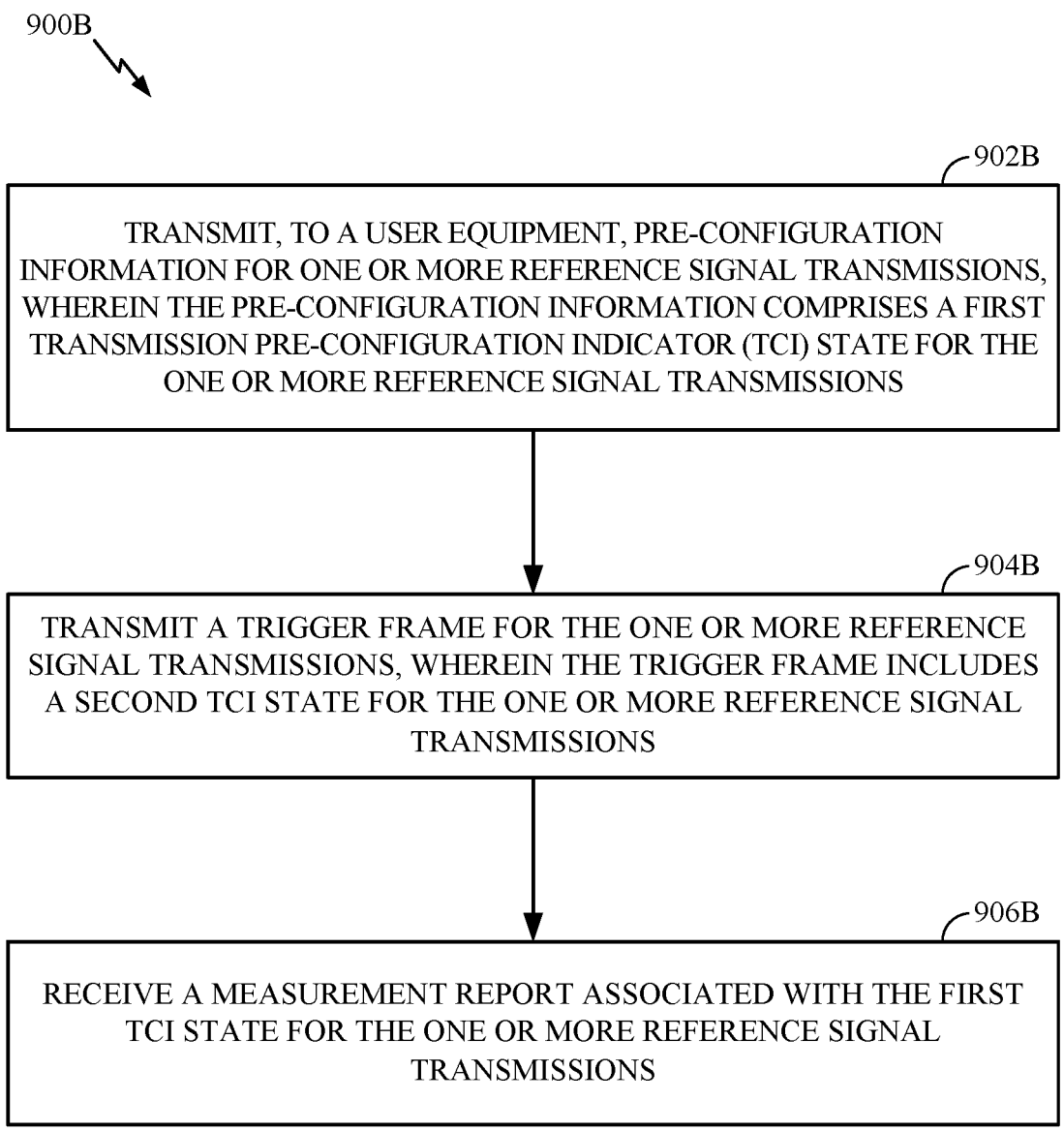
FIG. 9B illustrates example operations for wireless communications by a base station, in accordance with certain aspects of the present disclosure.

FIG. 9B illustrates example operations 900B for wireless communications in a network by a base station (BS), for example, for channel state information reference signal (CSI-RS) transmission. According to aspects, operations 900B may be considered complimentary to operations 900A performed by the UE.

According to aspects, the BS may include one or more components as illustrated in FIG. 4 which may be configured to perform the operations described herein. For example, the antenna 434, demodulator/modulator 432, controller/processor 440, and/or memory 442 as illustrated in FIG. 4 may perform the operations described herein.

Operations 900B begin at 902B transmitting, to a user equipment, pre-configuration information for one or more reference signal transmissions, wherein the pre-configuration information comprises a first transmission pre-configuration indicator (TCI) state for the one or more reference signal transmissions.

At 904B, the BS transmits a trigger frame for the one or more reference signal transmissions, wherein the trigger frame includes a second TCI state for the one or more reference signal transmissions.

At 906B, the BS receives a measurement report associated with the first TCI state for the one or more reference signal transmissions.

As noted above, aspects of the present disclosure propose techniques for allowing fast UE CSI-RS processing without consistently incurring CSI-RS processing overhead during the ON duration of the DRX cycle. In some cases, allowing for fast UE CSI-RS processing may involve preconfiguring a UE, operating in a CDRX mode, with a CSI-RS configuration that a UE may use to measure CSI-RSs during an ON duration of the CDRX mode. According to aspects, the CSI-RS configuration may be done via periodic, semi-persistent, or aperiodic triggers.

For example, the network (e.g., a gNB) may transmit pre-configuration information for one or more reference signal transmissions, which may be received by the UE, for example, at time T₀. The pre-configuration information may include transmission configuration indicator (TCI) state for the one or more reference signal transmissions. After receiving the pre-configuration information, the UE may configure itself with the TCI state or QCL information included in the pre-configuration information. The TCI state contains parameters for configuring a quasi-co-location (QCL) relationship between two or more antenna ports. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. For example, if a given CSI-RS is QCLed with a given SSB index with respect to spatial Rx, UE may use the same Rx beam to receive the given SSB to receive the given CSI-RS.

After configuring itself with the TCI state included in the pre-configuration information, the UE may perform, at a time T1 during an ON duration of the CDRX cycle, measurements on one or more reference signals based, at least in part, on the pre-configuration information. For example, the pre-configuration information may indicate TCI state information and when to measure CSI-RSs during the ON duration. Based on the TCI state information, the UE may perform measurements on the CSI-RSs during the ON duration.

At time T2 (after time T1) during the ON duration, the UE may determine if a trigger frame (e.g., an aperiodic CSI-RS trigger) associated with the one or more reference signal transmissions indicated in the pre-configuration information has been received. According to aspects, if the UE does not receive the trigger frame, the UE may discard/abort the CSI-RS measurement results or measurements, respectively. If, however, the UE determines that a trigger frame has been received, the UE may generate a CSI report based on the CSI-RS measurements and transmit it to the network (e.g., gNB), indicating a best beam for future transmissions.

In this case, since the UE is pre-configured, the CSI-RS can be sent by the network right after the CSI-RS trigger without leaving a gap for PDCCH or MAC-CE activation processing time and the time needed to program the corresponding TCI state at the UE. Accordingly, the UE may simply use the pre-configured TCI state for CSI-RS processing before the turnaround time which is traditionally required for the UE to process the trigger and program the corresponding TCI state for CSI-RS processing. According to aspects, the only cost to the UE is that the UE needs to process the potential CSI-RS symbols (which may or may not be transmitted) until it decodes the trigger.

Figure 10:
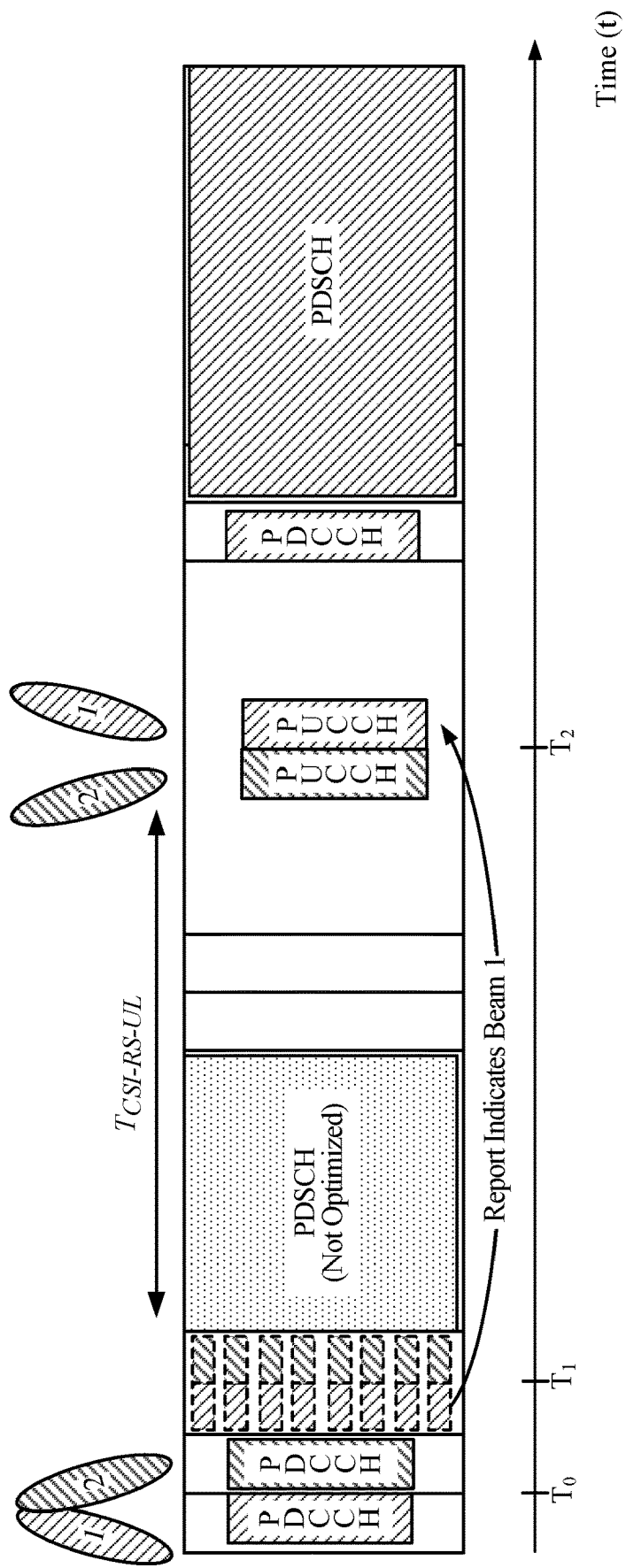
FIG. 10 illustrates an example aperiodic CSI-RS timeline with reduced processing delays, in accordance with certain aspects of the present disclosure.

FIG. 10 illustrates the aperiodic CSI-RS processing timeline when aspects of the present disclosure are used. As illustrated, the CSI-RS processing timeline may be reduced to a delay equal to $T_{CSI-RS\_UL}$, representing the time it takes for the UE to generate the CSI report (e.g. upon receiving a CSI-RS trigger) and prepare it for transmission. According to aspects, since the UE may be pre-configured with the CSI-RS TCI state, the UE may preemptively perform the CSI-RS measurements at $T_1$ and immediately generate and prepare the CSI report for transmission at $T_2$ upon receiving a CSI-RS trigger at $T_0$, thereby significantly reducing the CSI-RS timeline and allowing the UE to better accommodate aperiodic CSI-RS when operating in CDRX mode. For example, as illustrated in FIG. 10, because the UE may preemptively perform the CSI-RS measurements, the UE may not need to incur the time it takes to process the trigger (e.g., $T_{DCI\_CSI-RS}$) and then perform the CSI-RS measurements, unlike as shown in FIG. 7.

FIG. 11 is a table illustrating the reduced CSI-RS processing delay associated with aperiodic CSI-RS, according to certain aspects presented herein. As noted above, the reduced processing delay results from the time saved between the DCI trigger and to CSI-RS transmission/measurements (e.g., in some cases, being reduced to two symbols). For example, as can be seen, the total latency associated with RSRP measurements may be reduced from {30, 58, 106} (e.g. for fast, average, slow) illustrated in FIG. 8 to {18, 32, 60} in FIG. 11. Additionally, for wideband CRI-RI-CQI, the processing delay may be reduced from {55, 69, 89} in FIG. 8 to {43, 43, 43} in FIG. 11.

As noted above, aspects described above may also be extended to aperiodic SRS transmission. For example, in some cases, a UE may receive pre-configuration information, including a TCI state for aperiodic SRS transmission. Upon receiving the pre-configuration information, the UE may configure itself with the TCI state. Thereafter, upon receiving a trigger frame for SRS transmission, the UE may directly transmit the SRS, for example, without having to wait to configure itself with TCI state information included in the trigger frame.

Figure 12:
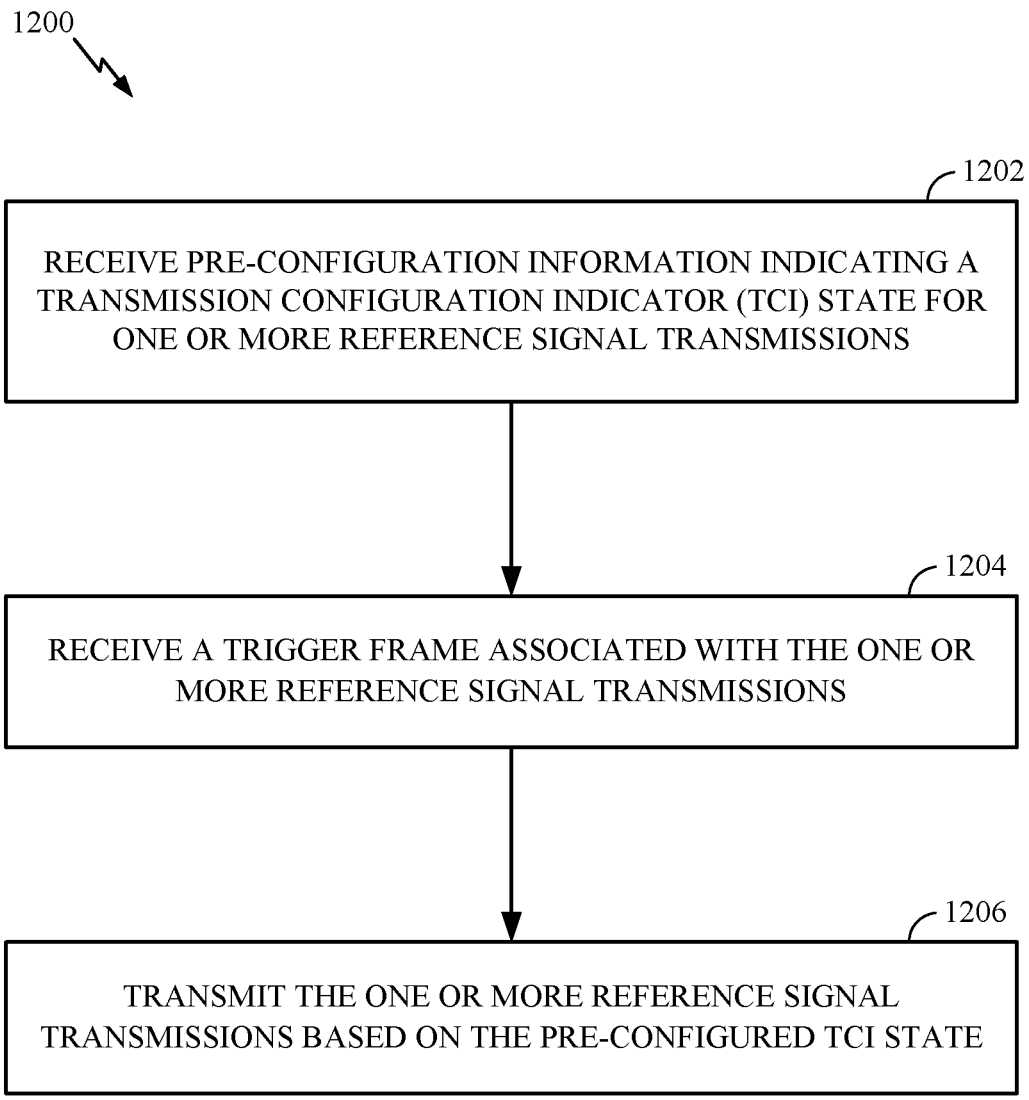
FIG. 12 illustrates example operations for wireless communications by a user equipment, in accordance with certain aspects of the present disclosure.
Figure 12A:
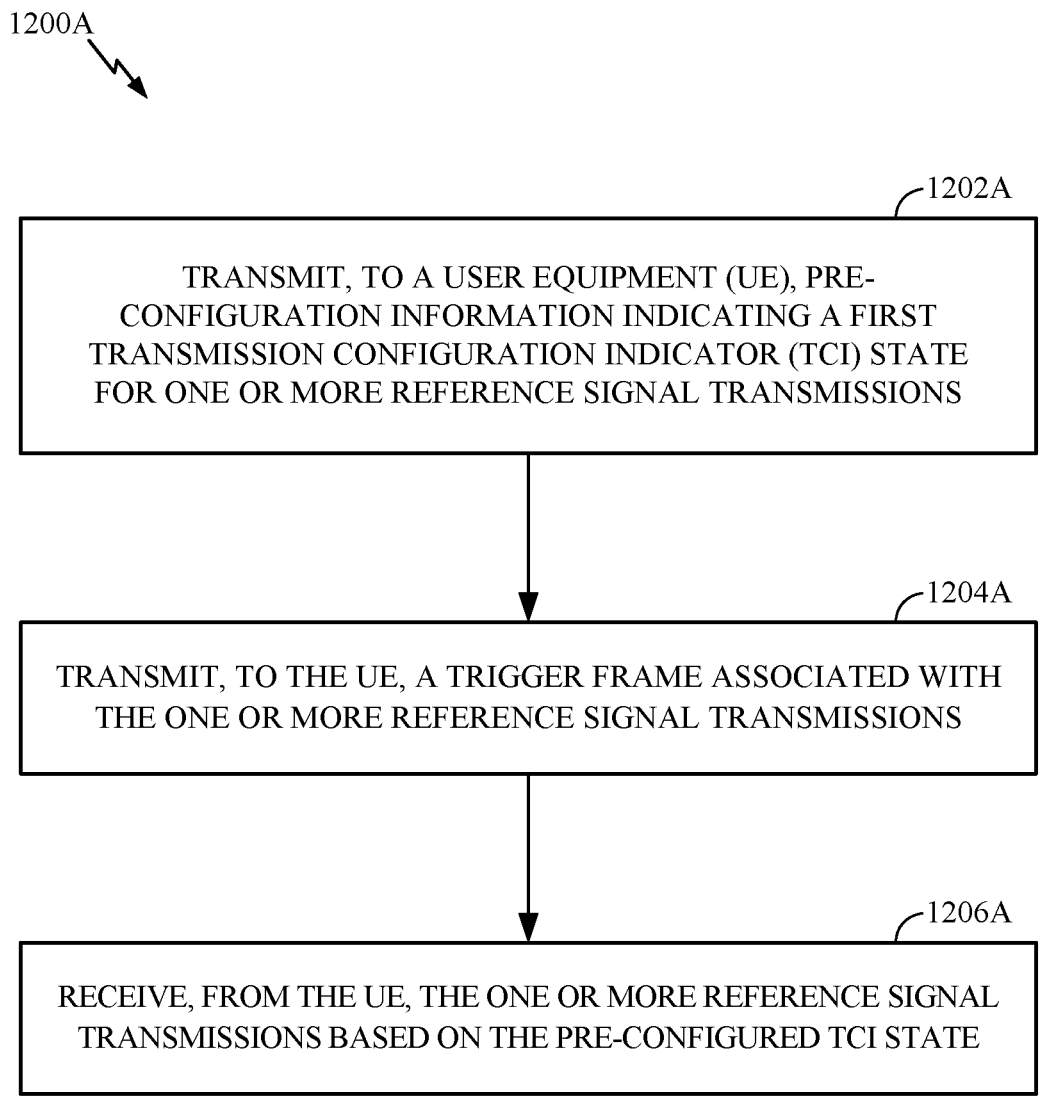
FIG. 12A illustrates example operations for wireless communications by a base station, in accordance with certain aspects of the present disclosure.

FIG. 12A illustrates example operations 1200A for wireless communications in a network by a user equipment, for example, for sounding reference signal (SRS) transmission. According to aspects, the UE may include one or more components as illustrated in FIG. 4 which may be configured to perform the operations described herein. For example, the antenna 452, demodulator/modulator 454, controller/processor 480, and/or memory 482 as illustrated in FIG. 4 may perform the operations described herein.

Operations 1200A begin at 1202A by receiving pre-configuration information indicating a transmission configuration indicator (TCI) state for one or more reference signal transmissions. In some cases, as noted above, the one or more reference signal transmission may comprise sounding reference signal (SRS) transmissions.

At 1204A, the UE receives a trigger frame associated with the one or more reference signal transmissions. In some cases, the trigger frame may be received on a physical downlink control channel (PDCCH), for example, as part of downlink control information. Additionally, in some cases, the trigger frame may include a second TCI state for transmitting the one or more reference signal transmissions.

At 1206A, the UE transmits the one or more reference signal transmissions based on the pre-configured TCI state. In some cases, the one or more reference signal transmissions are transmitted according to the pre-configured TCI state when the trigger frame does not leave the UE with enough time to configure the UE with the second TCI state after receiving and decoding the trigger frame. In some cases, however, the trigger frame may indicate a timeline for transmitting the one or more reference signal transmissions that includes enough time for the UE to reconfigure the UE with the second TCI state. Thus, in such a case, when the UE has enough time to reconfigure itself with the second TCI state, the UE may instead transmit the one or more reference signals using the second TCI state.

FIG. 12B illustrates example operations 1200B for wireless communications in a network by a user equipment, for example, for sounding reference signal (SRS) transmission. According to aspects, the BS may include one or more components as illustrated in FIG. 4 which may be configured to perform the operations described herein. For example, the antenna 434, demodulator/modulator 432, controller/processor 440, and/or memory 442 as illustrated in FIG. 4 may perform the operations described herein.

Operations 1200B begin at 1202B by transmitting, to a user equipment (UE), pre-configuration information indicating a first transmission configuration indicator (TCI) state for one or more reference signal transmissions.

At 1204B, the BS transmits, to the UE, a trigger frame associated with the one or more reference signal transmissions.

At 1206B, the BS receives, from the UE, the one or more reference signal transmissions based on the pre-configured TCI state.

Figure 13:
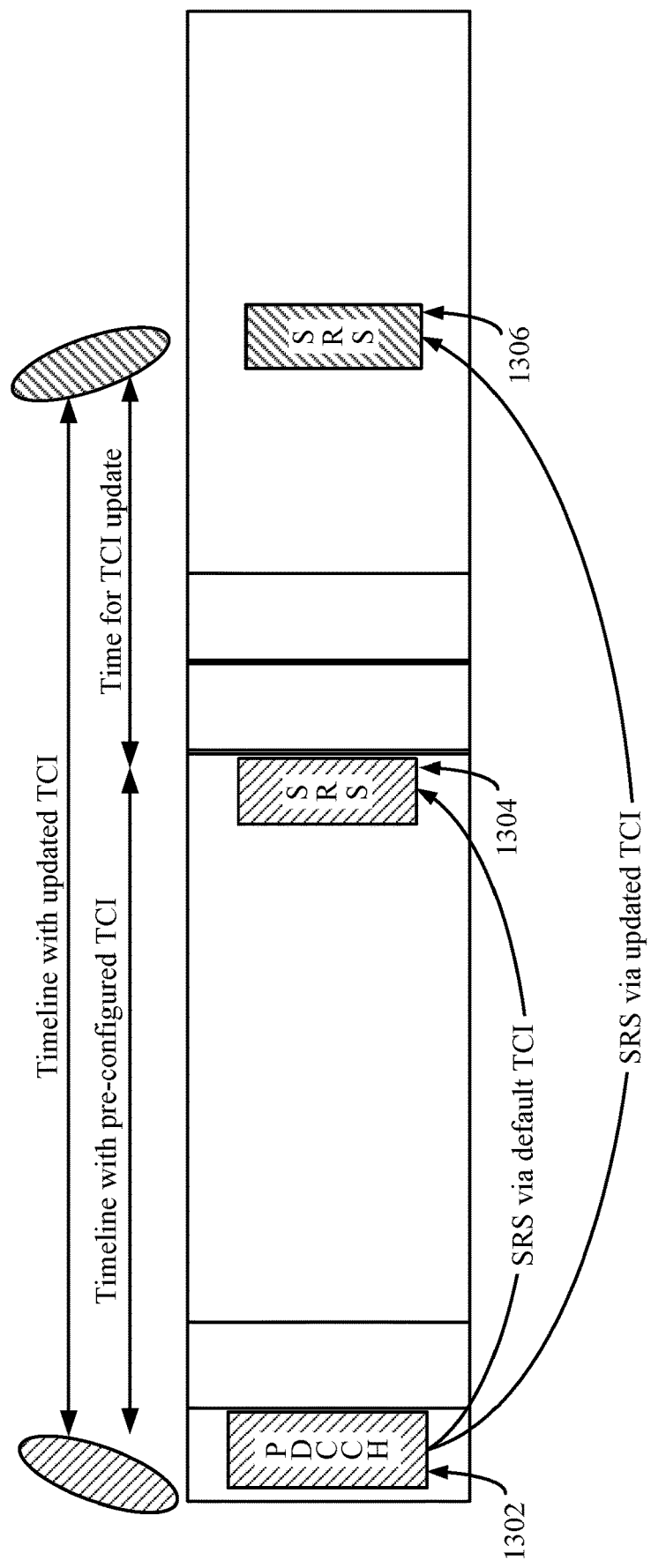
FIG. 13 illustrates an example reduced delay aperiodic SRS timeline, in accordance with certain aspects of the present disclosure.

FIG. 13 illustrates an SRS transmission timeline with reduced delay, according to certain aspects of the present disclosure. For example, as illustrated, the UE may transmit aperiodic SRS with a smaller processing time line with pre-configured TCI state. Additionally, with an updated TCI state, gNB will leave larger processing time for UE to switch to a different TCI based on the PDCCH trigger indication. More specifically, as illustrated in FIG. 13, the PDCCH 1302 may carry an aperiodic SRS trigger. According to aspects, when the PDCCH 1302 triggers SRS with pre-configured TCI state, the SRS can be transmitted earlier (e.g., SRS 1304). Further, when the PDCCH 1302 triggers SRS where the TCI state for SRS is indicated in PDCCH, longer processing time is required (e.g., SRS 1306). Therefore, as can be seen, with pre-configured TCI states for aperiodic SRS, the processing time may be shorter.

Figure 14:
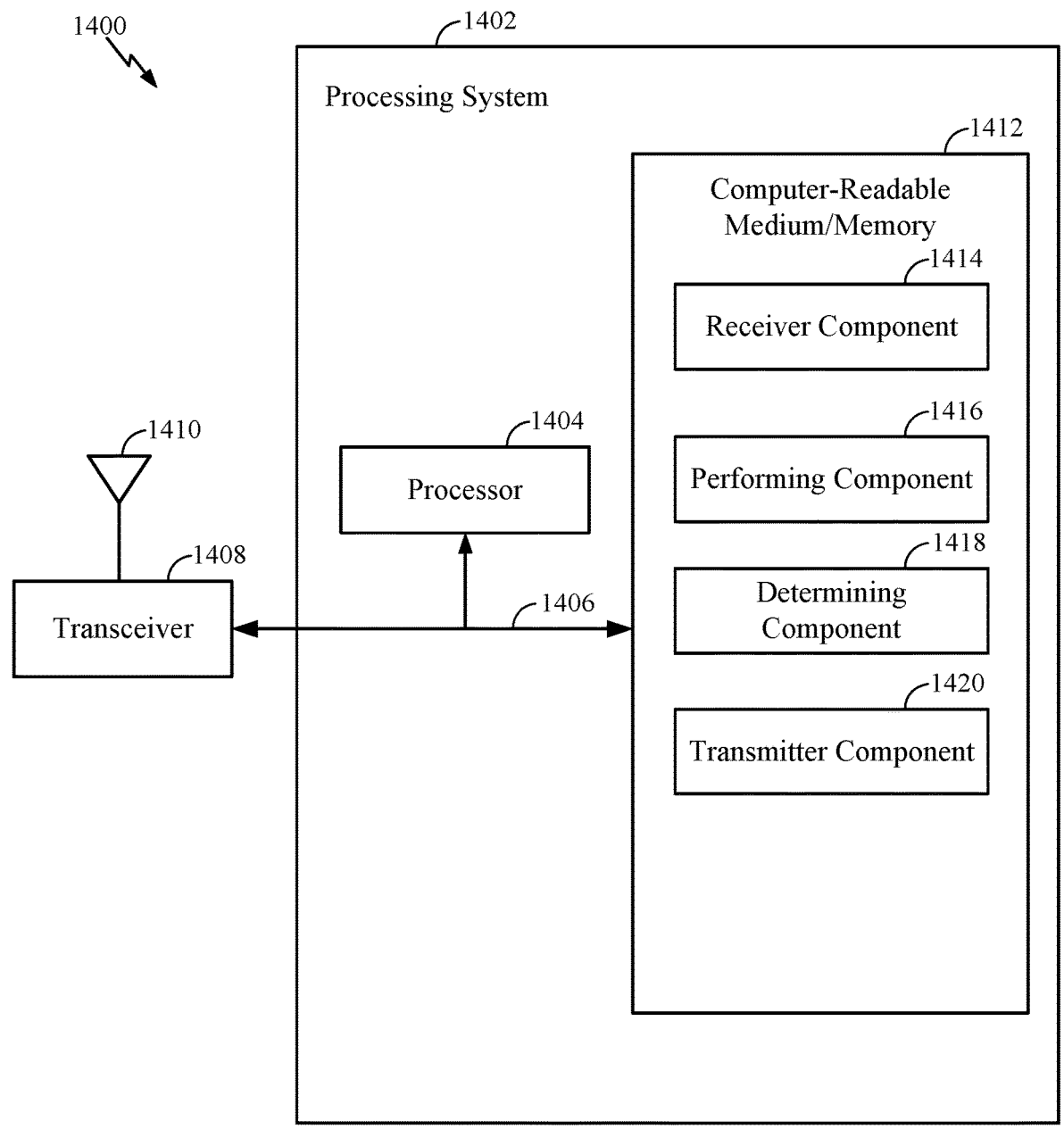
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIGS. 9A and 12A. The communications device 1400 includes a processing system 1402 coupled to a transceiver 1408. The transceiver 1408 is configured to transmit and receive signals for the communications device 1400 via an antenna 1410, such as the various signal described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions that when executed by processor 1404, cause the processor 1404 to perform the operations illustrated in FIGS. 9A and 12A, or other operations for performing the various techniques discussed herein.

In certain aspects, the processor system 1402 further includes a receiver component 1414 for performing the operations illustrated in FIG. 9A at 902A and/or FIG. 12A at 1202A and 1204A. Additionally, the processing system 1402 includes a performing component 1416 for performing the operations illustrated in FIG. 9A at 904A. Additionally, the processing system 1402 includes a determining component 1418 for performing the operations illustrated in FIG. 9A at 906A. Additionally, the processing system 1402 includes a transmitter component 1420 for performing the operations illustrated in FIG. 9A at 908A and/or FIG. 12A at 1206A. The receiver component 1414, performing component 1416, determining component 1418, and the transmitter component 1420 may be coupled to the processor 1404 via bus 1406. In certain aspects, receiver component 1414, performing component 1416, determining component 1418, and the transmitter component 1420 may be hardware circuits. In certain aspects, the receiver component 1414, performing component 1416, determining component 1418, and the transmitter component 1420 may be software components that are executed and run on processor 1404.

Figure 15:
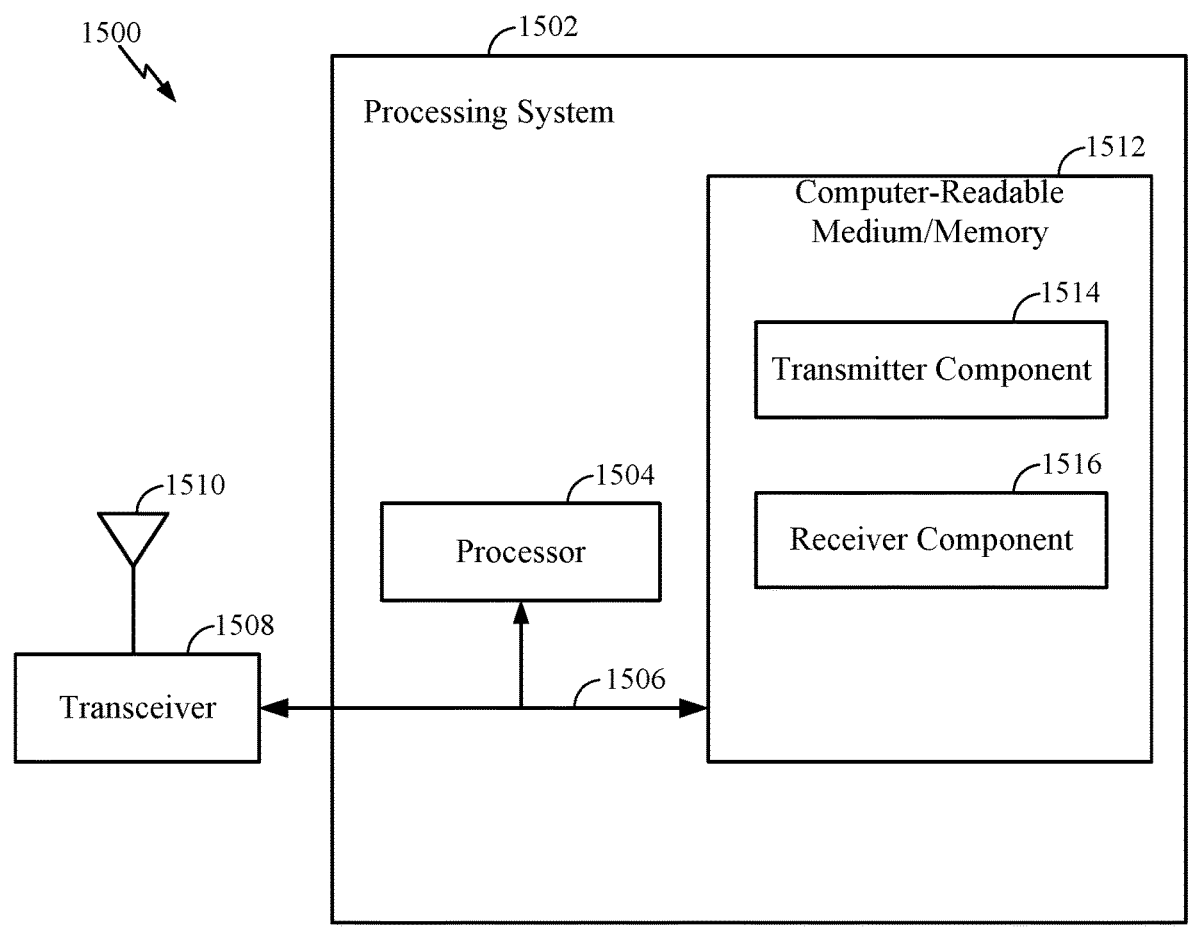
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIGS. 9B and 12B. The communications device 1500 includes a processing system 1502 coupled to a transceiver 1508. The transceiver 1508 is configured to transmit and receive signals for the communications device 1500 via an antenna 1510, such as the various signal described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions that when executed by processor 1504, cause the processor 1504 to perform the operations illustrated in FIGS. 9B and 12B, or other operations for performing the various techniques discussed herein.

In certain aspects, the processor system 1502 further includes a transmitter component 1514 for performing the operations illustrated in FIG. 9B at 902A and 904B and/or FIG. 12B at 1202B and 1204B. Additionally, the processing system 1502 includes a receiver component 1516 for performing the operations illustrated in FIG. 9B at 906B and/or FIG. 12B at 1206B. The transmitter component 1514 and receiver component 1516 may be coupled to the processor 1504 via bus 1506. In certain aspects, transmitter component 1514 and receiver component 1516 may be hardware circuits. In certain aspects, the transmitter component 1514 and receiver component 1516 may be software components that are executed and run on processor 1504.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 9A, 9B, 12A, and 12B.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), comprising:
   receiving pre-configuration information for one or more reference signal transmissions;
   performing, at a first time during an ON duration of a discontinuous reception (DRX) cycle, measurements on one or more reference signals based, at least in part, on the pre-configuration information;
   determining if, at a second time during the ON duration after the first time, a trigger frame corresponding to the one or more reference signal transmissions has been received, wherein the trigger frame includes information for triggering the UE to perform the measurements on the one or more reference signals; and
   transmitting a measurement report corresponding to the measurements if the trigger frame has been received.

2. The method of claim 1, wherein the pre-configuration information includes a transmission pre-configuration indicator (TCI) state for the one or more reference signal transmissions.

3. The method of claim 2, further comprising configuring the UE with the TCI state included in the pre-configuration information prior to performing the measurements.

4. The method of claim 3, wherein the measurements are performed according to the configured TCI state.

5. The method of claim 2, wherein the TCI state includes parameters for configuring a quasi-co-location (QCL) relationship between two or more antenna ports of the UE.

6. The method of claim 1, wherein the pre-configuration information is received at a time prior to the ON duration.

7. The method of claim 1, further comprising dropping the measurement report from transmission if a trigger frame has not been received.

8. The method of claim 1, wherein the trigger frame is transmitted periodically, semi-persistently, or aperiodically.

9. The method of claim 1, wherein the trigger frame is received on a physical downlink control channel (PDCCH) or as a media access control-control element (MAC-CE).

10. The method of claim 1, wherein the measurement report includes measurement information for one or more transmission beams associated with the one or more reference signals.

11. An apparatus for wireless communication, comprising:
    a memory comprising executable instructions; and
    at least one processor configured to execute the executable instructions and cause the apparatus to:
    receive pre-configuration information for one or more reference signal transmissions;
    perform, at a first time during an ON duration of a discontinuous reception (DRX) cycle, measurements on one or more reference signals based, at least in part, on the pre-configuration information;
    determine if, at a second time during the ON duration after the first time, a trigger frame corresponding to the one or more reference signal transmissions has been received, wherein the trigger frame includes information for triggering the apparatus to perform the measurements on the one or more reference signals; and
    transmit a measurement report corresponding to the measurements if the trigger frame has been received.

12. The apparatus of claim 11, wherein:
    the pre-configuration information includes a transmission pre-configuration indicator (TCI) state for the one or more reference signal transmissions; and
    the at least one processor is further configured to cause the apparatus to be configured with the TCI state included in the pre-configuration information prior to performing the measurements.

13. The apparatus of claim 12, wherein the at least one processor is configured to cause the apparatus to perform the measurements according to the configured TCI state.

14. The apparatus of claim 12, wherein the TCI state includes parameters for configuring a quasi-co-location (QCL) relationship between two or more antenna ports of the apparatus.

15. The apparatus of claim 11, wherein the at least one processor is configured to cause the apparatus to receive the pre-configuration information at a time prior to the ON duration.

16. The apparatus of claim 11, wherein the at least one processor is further configured to cause the apparatus to drop the measurement report from transmission if a trigger frame has not been received.

17. The apparatus of claim 11, wherein the trigger frame is transmitted periodically, semi-persistently, or aperiodically.

18. The apparatus of claim 11, wherein at least one processor is further configured to cause the apparatus to receive the trigger frame on a physical downlink control channel (PDCCH) or as a media access control-control element (MAC-CE).

19. The apparatus of claim 11, wherein the measurement report includes measurement information for one or more transmission beams associated with the one or more reference signals.

20. An apparatus for wireless communication by a user equipment (UE), comprising:
   means for receiving pre-configuration information for one or more reference signal transmissions;
   means for performing, at a first time during an ON duration of a discontinuous reception (DRX) cycle, measurements on one or more reference signals based, at least in part, on the pre-configuration information;
   means for determining if, at a second time during the ON duration after the first time, a trigger frame corresponding to the one or more reference signal transmissions has been received, wherein the trigger frame includes information for triggering the UE to perform the measurements on the one or more reference signals; and
   means for transmitting a measurement report corresponding to the measurements if the trigger frame has been received.

21. The apparatus of claim 20, wherein the pre-configuration information includes a transmission pre-configuration indicator (TCI) state for the one or more reference signal transmissions.

22. The apparatus of claim 21, wherein the TCI state includes parameters for configuring a quasi-co-location (QCL) relationship between two or more antenna ports of the UE.

23. The apparatus of claim 21, further comprising means for configuring the UE with the TCI state included in the pre-configuration information prior to performing the measurements.

24. The apparatus of claim 23, wherein the means for performing the measurements are configured to perform the measurements according to the configured TCI state.

25. The apparatus of claim 20, wherein the means for receiving the pre-configuration information are configured to receive the pre-configuration information at a time prior to the ON duration.

26. The apparatus of claim 20, further comprising means for dropping the measurement report from transmission if a trigger frame has not been received.

27. The apparatus of claim 20, wherein the trigger frame is transmitted periodically, semi-persistently, or aperiodically.

28. The apparatus of claim 20, further comprising means for receiving the trigger frame on a physical downlink control channel (PDCCH) or as a media access control-control element (MAC-CE).

29. The apparatus of claim 20, wherein the measurement report includes measurement information for one or more transmission beams associated with the one or more reference signals.

30. A non-transitory computer-readable medium, comprising: executable instructions that, when executed by a processor of an apparatus, cause the apparatus to:
   receive pre-configuration information for one or more reference signal transmissions; perform, at a first time during an ON duration of a discontinuous reception (DRX) cycle, measurements on one or more reference signals based, at least in part, on the pre-configuration information;
   determine if, at a second time during the ON duration after the first time, a trigger frame corresponding to the one or more reference signal transmissions has been received, wherein the trigger frame includes information for triggering the apparatus to perform the measurements on the one or more reference signals; and
   transmit a measurement report corresponding to the measurements if the trigger frame has been received.

31. The non-transitory computer-readable medium of claim 30, wherein the pre-configuration information includes a transmission pre-configuration indicator (TCI) state for the one or more reference signal transmissions.

32. The non-transitory computer-readable medium of claim 31, wherein the TCI state includes parameters for configuring a quasi-co-location (QCL) relationship between two or more antenna ports of the apparatus.

33. The non-transitory computer-readable medium of claim 31, further comprising executable instructions that cause the apparatus to be configured with the TCI state included in the pre-configuration information prior to performing the measurements.

34. The non-transitory computer-readable medium of claim 33, wherein the executable instructions that cause the apparatus to perform the measurements further include executable instructions that cause the apparatus to perform the measurements according to the configured TCI state.

35. The non-transitory computer-readable medium of claim 30, wherein the executable instructions that cause the apparatus to receive pre-the configuration information further include executable instructions that cause the apparatus to receive the pre-configuration information at a time prior to the ON duration.

36. The non-transitory computer-readable medium of claim 30, further comprising executable instructions that cause the apparatus to drop the measurement report from transmission if a trigger frame has not been received.

37. The non-transitory computer-readable medium of claim 30, wherein the trigger frame is transmitted periodically, semi-persistently, or aperiodically.

38. The non-transitory computer-readable medium of claim 30, further comprising executable instructions that cause the apparatus to receive the trigger frame on a physical downlink control channel (PDCCH) or as a media access control-control element (MAC-CE).

39. The non-transitory computer-readable medium of claim 30, wherein the measurement report includes measurement information for one or more transmission beams associated with the one or more reference signals.

* * * * *